H. A. JENSENIUS.
ACCUMULATOR SAFETY VALVE.
APPLICATION FILED JAN. 2, 1919.
1,406,026.
Patented Feb. 7, 1922.
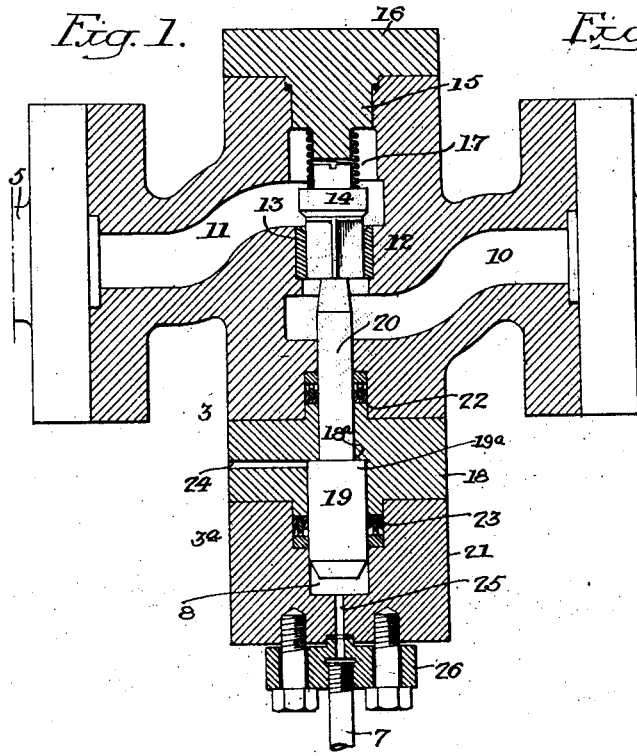
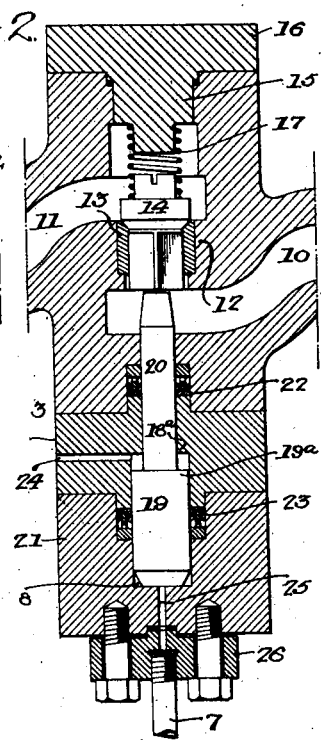
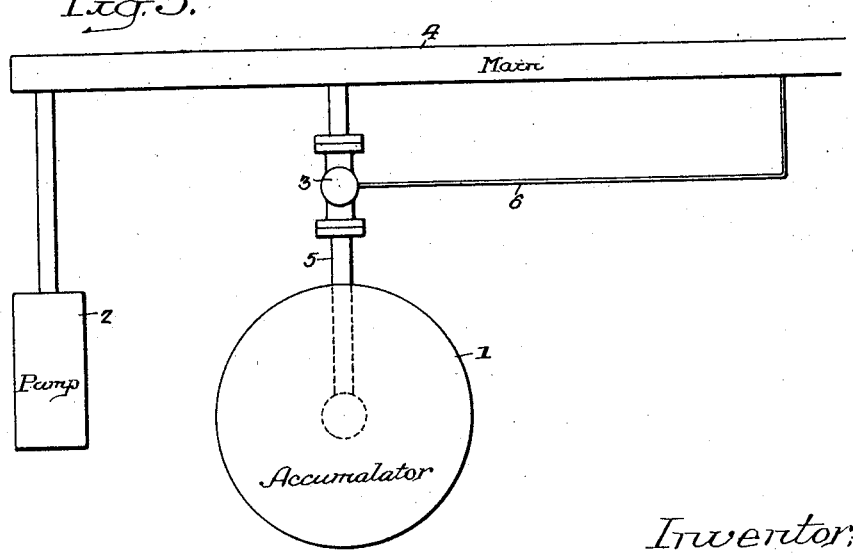
Inventor:
Herman A. Jensenius,
by his Attorneys.

UNITED STATES PATENT OFFICE.

HERMAN A. JENSENIUS, OF PHILADELPHIA, PENNSYLVANIA.

ACCUMULATOR SAFETY VALVE.

1,406,026.  Specification of Letters Patent.  Patented Feb. 7, 1922.

Application filed January 2, 1919. Serial No. 269,186.

*To all whom it may concern:*

Be it known that I, HERMAN A. JENSENIUS, a citizen of the United States, residing in Philadelphia, Pennsylvania, have invented certain Improvements in Accumulator Safety Valves, of which the following is a specification.

My invention relates to certain improvements in safety valves used in connection with an accumulator of a hydraulic system.

One object of the invention is to improve the means for holding the valve in its raised position so as to allow the fluid to pass freely through the valve casing under normal conditions, but, in the case of breakage in the system, due to accident, or other cause, the valve will close automatically, preventing the descent of the accumulator and consequent breakage of parts and loss of energy.

A further object of the invention is to construct the flange for holding the valve off of its seat so that it will, when in the raised position, bear against the piston stop, allowing the valve a certain amount of freedom.

In the accompanying drawings:

Fig. 1 is a vertical sectional view of my improved valve mechanism, showing the valve off of its seat so as to allow the fluid to pass freely through the valve casing;

Fig. 2 is a view, similar to Fig. 1, showing the valve seated, and

Fig. 3 is a diagram view showing the valve in the pipe leading to and from the accumulator and to the main which connects with the pump and with the hydraulic machines.

Referring to Fig. 3, 1 is an accumulator, of any of the ordinary types. 2 is a pump, or other pressure device. 3 is a valve structure. 4 is the main leading from the pump and connected by a pipe 5 with the accumulator and with one or more hydraulic machines. 6 is a pipe leading from the main some distance from the pipe 5 and communicating through the medium of a branched pipe 7 with a cylinder 8 in the valve structure 3. The valve structure 3 has ports 10 and 11. The port 10 communicates with the main 4 and the port 11 communicates with the pipe 5 leading to and from the accumulator. The parts are separated by a partition 12, in which is an annular valve seat 13 for the valve 14. Between the upper portion of the valve and the projection 15 of a cap 16 is a spring 17 creating enough pressure on the valve to hold it in position, and also tending to close the valve quickly when the valve 14 is relieved from pressure of a plunger 19, which is mounted in the cylinder 8 of the valve structure 3 and has a stem 20, which projects into the port 10 in close proximity to the bottom of the valve 14 when in its lowest position, and when the plunger is raised it positively lifts the valve 14 off of its seat. The cylinder 8 is formed in an extension 3ª of the valve structure and this extension is made in two parts 18 and 21 and the cylinder is formed in both parts, as clearly shown in the drawings. The plunger is so proportioned in relation to the cylinder that the upper end 19ª of the plunger may strike a shoulder 18ª on the part 18 of the extension when the plunger is raised to its full extent. By limiting the upward movement of the plunger, the valve is raised off of its seat a sufficient distance, but is allowed freedom of movement, being held by the spring 17 onto the end of the stem of the plunger, thus relieving the cap and valve from the pressure of the plunger.

By making the extension in two parts, as shown, I am enabled to provide suitable packing 22 which surrounds the stem 20 and between the cylinder 8 and the port 10. The packing is U-shaped in cross section and the pressure in the port 10 will tend to expand the packing so as to prevent leakage. Between the portions 18 and 21 of the extension 3ª is an inverted U-shaped packing 23, which is expanded when pressure is in the lower portion of the cylinder 8. In the section 18 of the extension is a passage 24 communicating with the upper end of the cylinder 8 so as to relieve the upper end of the cylinder from pressure, as this passage communicates with the atmosphere.

The pipe 7 is screwed into a cap 26, which is attached by screws, in the present instance, to the portion 21 of the extension 3ª of the valve structure, and in this portion 21 is a passage 25 leading to the cylinder 8.

Should a break occur in the main 4, the pressure in the cylinder 8, under the plunger 19, will be relieved and the valve 14 will be immediately closed by pressure from the accumulator 1 through the pipe 5 and the port 11, thus holding the accumulator, preventing its descent and consequent breakage of parts and loss of energy. This accumulator may remain in the raised position until the repair is made, or it may be lowered by opening a drip pipe communicating either with the accumulator stand pipe or with the pipe 5 leading thereto By the above construction, it will be seen that I provide a very simple structure which will immediately close the passage leading to and from the accumulator when a leakage occurs and which will positively lift the valve and hold it in its reaised position when the parts are in the normal condition, and, as the plunger will be resting against a shoulder on the casing, its movement will be limited and will relieve the valve in its raised position so that it will be free, being held against one end of the stem of the plunger by its spring.

I claim:

The combination of a valve casing having ports therein; a partition separating the ports, one port leading to an accumulator and the other leading to a main connected to a pressure device; a valve in the casing normally held off of its seat so as to allow free circulation between the accumulator and the main; a cylinder in the valve casing; a plunger in the cylinder having a reduced stem projecting through a passage in the casing and into the port leading to the main, the cylinder being of such a length that it will form a stop for the plunger when the plunger is projected to lift the valve off of its seat; a cap; a spring between the cap and the valve tending to close the valve on its seat; and a pipe communicating with the lower end of the cylinder and with the main some distance from the valve so that, in the event of a breakage in the main, or in the machines communicating therewith, the plunger will be released and the valve will close and hold the pressure in the accumulator.

In witness whereof I affix my signature.

HERMAN A. JENSENIUS.